(12) United States Patent
Kuwahara

(10) Patent No.: US 9,186,792 B2
(45) Date of Patent: Nov. 17, 2015

(54) TEACHING SYSTEM, TEACHING METHOD AND ROBOT SYSTEM

(71) Applicant: KABUSHIKI KAISHA YASKAWA DENKI, Kitakyushu-shi (JP)

(72) Inventor: Koichi Kuwahara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/186,062

(22) Filed: Feb. 21, 2014

(65) Prior Publication Data

US 2014/0236356 A1 Aug. 21, 2014

(30) Foreign Application Priority Data

Feb. 21, 2013 (JP) ................................. 2013-032171

(51) Int. Cl.
*G05B 19/00* (2006.01)
*B25J 9/16* (2006.01)

(52) U.S. Cl.
CPC ................ *B25J 9/161* (2013.01); *B25J 9/1671* (2013.01)

(58) Field of Classification Search
CPC ........... G05B 2219/39031; G05B 2219/40122; B25J 9/1671
USPC ................ 700/245, 248, 264, 253–254, 259; 318/567, 568.12, 568.16, 318/568.21–568.25
See application file for complete search history.

(56) References Cited

U.S. PATENT DOCUMENTS

| 4,675,502 A * | 6/1987 | Haefner et al. ........... 219/124.34 |
| 4,954,762 A * | 9/1990 | Miyake et al. ........... 318/568.19 |
| 2006/0025890 A1 | 2/2006 | Nagatsuka et al. |

FOREIGN PATENT DOCUMENTS

| CN | 1734379 | 2/2006 |
| JP | 2000-020120 | 1/2000 |
| JP | 2006-48244 | 2/2006 |
| JP | 2006-136975 | 6/2006 |

OTHER PUBLICATIONS

Japanese Office Action for corresponding JP Application No. 2013-032171, Oct. 7, 2014.
Chinese Office Action for corresponding CN Application No. 201410056668.8, Jul. 10, 2015.
Korean Office Action for corresponding KR Application No. 10-2014-0019513, Aug. 25, 2015.

* cited by examiner

*Primary Examiner* — Dalena Tran
(74) *Attorney, Agent, or Firm* — Mori & Ward, LLP

(57) ABSTRACT

In a teaching system including a display unit, an image generating unit generates a virtual image of a robot, a workpiece and a positioner for holding the workpiece. A display control unit controls the display unit to display the generated virtual image. Upon receiving an operator's operation of selecting a ridgeline of the workpiece of the virtual image, a work line generating unit extracts individual teaching target points of the ridgeline and generates a work line as a set of line segments each interconnecting the target points adjoining each other. A calculation unit calculates teaching values for positions and postures of the positioner on a point-by-point basis so that a vector direction of the work line at each target point becomes substantially parallel to a horizontal direction. A teaching program generating unit generates a teaching program for operating the positioner based on the calculated teaching values.

14 Claims, 8 Drawing Sheets

ARROW DIRECTION A

FIG. 6A
| NUMBER | CONTENT |
|--------|---------|
| 1 | Ex1:45.00,Ex2:0.00 |
| 2 | Ex1:-45.00,Ex2:-180.00 |
| | |
| | |
| | |
OK    Cancel
~123
FIG. 6B
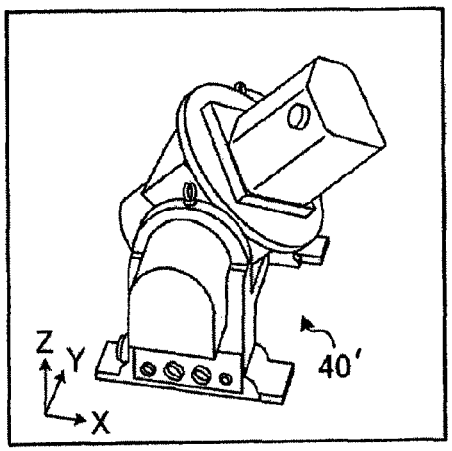
FIG. 6C
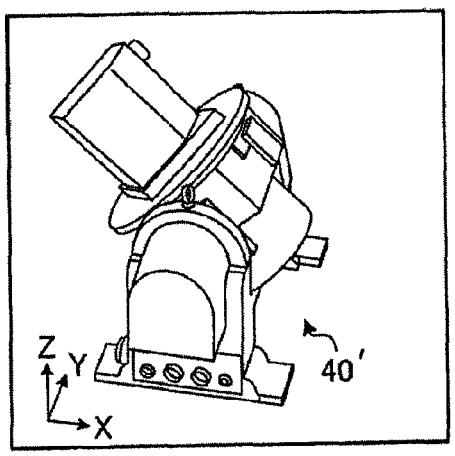

TEACHING SYSTEM, TEACHING METHOD AND ROBOT SYSTEM

CROSS-REFERENCE TO RELATED APPLICATION

The present disclosure contains subject matter related to that disclosed in Japanese Priority Patent Application No. 2013-032171 filed with the Japan Patent Office on Feb. 21, 2013, the entire contents of which are incorporated herein by reference.

BACKGROUND OF THE INVENTION

1. Field of the Invention

An embodiment disclosed herein relates to a teaching system, a teaching method and a robot system.

2. Description of the Related Art

Conventionally, there have been proposed different kinds of teaching systems which graphically display a three-dimensional model image of a robot system on a display device based on three-dimensional CAD (Computer Aided Design) data and which operate the three-dimensional model image to prepare teaching data by carrying out simulative calculation of a motion of the robot system (see, e.g., Japanese Patent Application Publication No. 2000-20120).

By using the teaching systems mentioned above, an operator can prepare teaching data while verifying whether a robot interferes with surrounding equipment, without having to actually operate the robot and the external axes thereof.

For example, a "robot teaching system" disclosed in Japanese Patent Application Publication No. 2000-20120 is designed to perform off-line teaching by preparing teaching data for a welding robot system including a welding robot and a workpiece positioning device (hereinafter referred to as a "positioner").

However, the conventional teaching systems mentioned above, which pertain to the teaching of a welding robot system, has a room for improvement in that a welding line needs to be easily kept horizontal so as to improve a welding quality.

More specifically, a need has conventionally existed in a welding work to keep horizontal the portion of a welding line where a welding work is carried out, thereby preventing a welding bead from flowing down under the action of the gravity. To this end, it is required to perform fine and precise teaching for appropriately changing the position and posture of a workpiece in conformity with the shape of different welding lines with respect to a positioner.

For example, if the positioner has a plurality of axes such as two axes of a tilting axis and a rotation axis or the like, the teaching for keeping the welding line horizontal becomes highly abstruse. For that reason, it is very burdensome for the operator to manually keep the welding line horizontal on the work spot. In the case of off-line teaching, the procedures are complex.

The conventional teaching systems mentioned above fail to disclose or suggest a method of keeping the welding line horizontal. Thus, when performing the teaching of a welding robot system, there is a need to easily keep a welding line horizontal and to improve a welding quality.

In addition to the welding robot system, it is sometimes necessary in, e.g., a sealing robot system including a sealing robot and a positioner, to keep a sealing portion horizontal and to improve a sealing material application quality.

SUMMARY OF THE INVENTION

In accordance with an aspect of the embodiment, a teaching system including: a display unit; an image generating unit configured to generate a virtual image of a robot, a workpiece as a work target of the robot and a positioner for holding the workpiece; a display control unit configured to control the display unit to display the virtual image generated by the image generating unit; a work line generating unit configured to, upon receiving an operator's operation of selecting a ridgeline of the workpiece of the virtual image, extract individual teaching target points of the ridgeline and generate a work line as a set of line segments each interconnecting the target points adjoining each other; a calculation unit configured to calculate teaching values for positions and postures of the positioner on a point-by-point basis so that a vector direction of the work line at each of the target points becomes substantially parallel to a horizontal direction; and a teaching program generating unit configured to generate a teaching program for operating the positioner based on the teaching values calculated by the calculation unit.

BRIEF DESCRIPTION OF THE DRAWINGS

FIG. 6A is a view showing an operation procedure according to a first modified example.

FIG. 6B is the first view showing a display example according to a first modified example.

FIG. 6C is a second view showing the display example according to the first modified example.

DESCRIPTION OF THE EMBODIMENTS

An embodiment of a teaching system and a teaching method will now be described in detail with reference to the accompanying drawings. The present disclosure is not limited to the embodiment to be described below.

The following description will be made by taking, as an example, a teaching system that displays a graphic image of a three-dimensional model of a robot on a display unit such as an LCD (liquid crystal display) or the like. The graphic image of the three-dimensional model will be sometimes referred to as a "virtual image" herein below.

While the following description will be made by taking, as an example, a welding robot system including a welding robot and a positioner, the present disclosure is not limited to the welding robot system but may be applied to, e.g., a sealing robot system including a sealing robot and a positioner. In the following description, the welding robot will be referred to as a "robot" and the welding robot system will be referred to as a "robot system".

Figure 1:
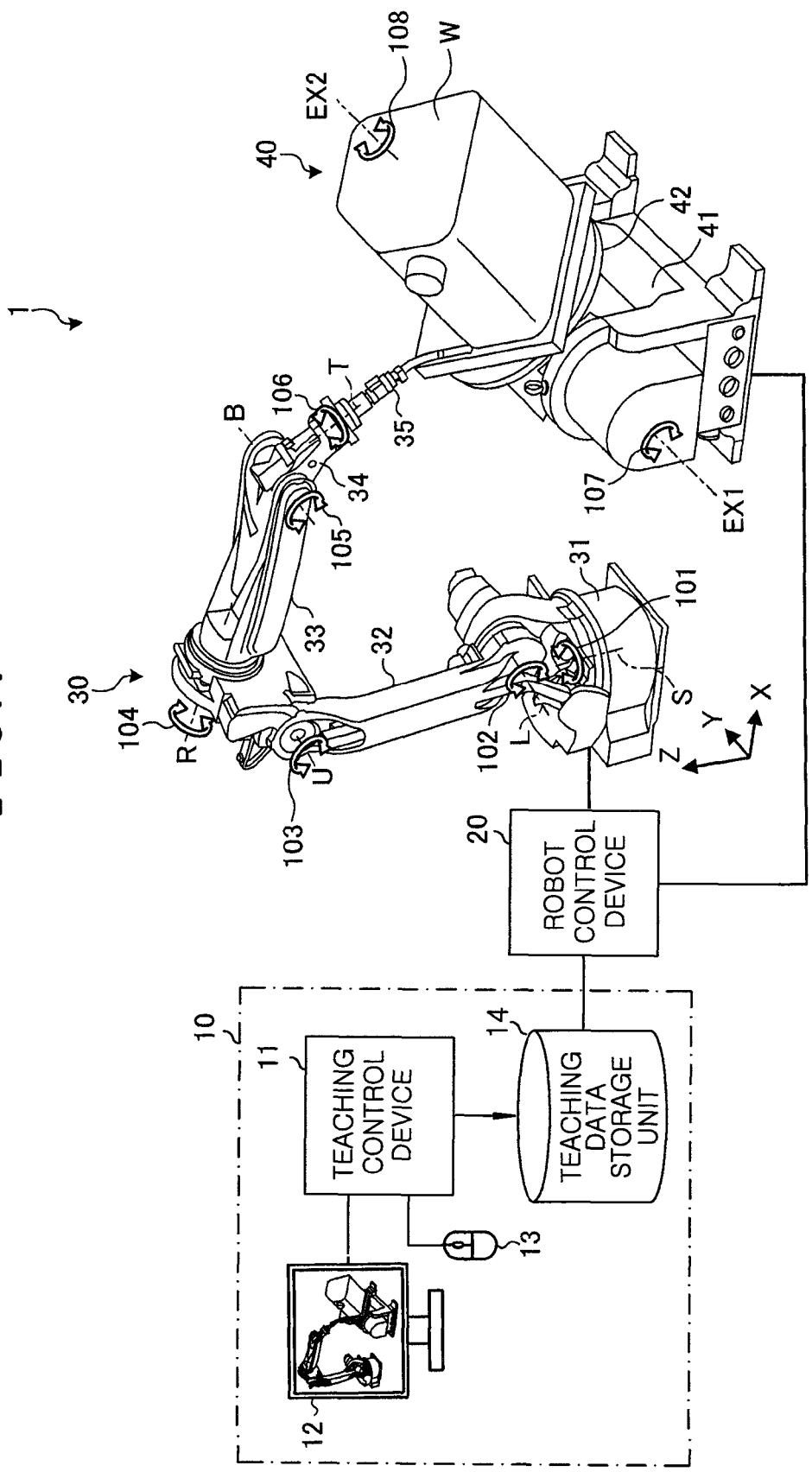
FIG. 1 is a schematic diagram showing an overall configuration of a robot system including a teaching system according to an embodiment.

FIG. 1 is a schematic diagram showing an overall configuration of a robot system 1 including a teaching system 10 according to an embodiment.

As shown in FIG. 1, the robot system 1 includes the teaching system 10, a robot control device 20, a robot 30 and a positioner 40. The teaching system 10 includes a teaching control device 11, a display unit 12, an operation unit 13 and a teaching data storage unit (database) 14.

The teaching control device 11 is a controller which controls the entire teaching system 10. The teaching control device 11 includes an arithmetic processing unit, a memory unit, and so forth. The teaching control device 11 is connected to various parts of the teaching system 10 such as the display unit 12 and the like, so that data transmission can be carried out therebetween.

The teaching control device 11 outputs to the display unit 12 a virtual image including the robot 30 and the positioner 40 whose motions are simulatively calculated based on an operator's operation through the operation unit 13.

The teaching control device 11 generates one or more teaching programs for operating the robot 30 and the positioner 40 of the virtual image in response to the operator's operation through the operation unit 13 and registers the teaching programs in the teaching data storage unit 14.

The display unit 12 is a display device such as a so-called LCD or the like. The operation unit 13 is a pointing device such as a mouse or the like. The operation unit 13 need not be necessarily formed of a hardware component but may be a software component, e.g., touch keys indicated on a touch panel display.

The teaching data storage unit 14 is a database that registers the teaching programs for operating the robot 30 and the positioner 40 and the teaching information such as "teaching points" included in the teaching programs and the like.

The term "teaching points" used herein refers to the information that indicates target positions through which the respective joints of the robot 30 and the positioner 40 need to pass during an operation of the robot 30 and the positioner 40. The teaching points are stored as, e.g., pulse values of individual encoders arranged in servo motors for driving the respective shafts of the robot 30 and the positioner 40. The robot 30 and the positioner 40 are operated based on the information on a plurality of teaching points. Therefore, in the teaching data storage unit 14, the teaching points are stored in connection with the motions (jobs) of the robot 30 and the positioner 40.

In other words, the teaching programs of the robot 30 and the positioner 40 include combined information on the teaching points, operation commands for interpolation between the respective teaching points, and operation commands to end effectors and the like. The teaching data storage unit 14 is configured to store, with respect to each of the teaching programs of the robot 30 and the positioner 40, information on the teaching points included in each of the teaching programs. For example, when the robot 30 is operated, the robot 30 is moved pursuant to the teaching programs.

The teaching data storage unit 14 is connected to the robot control device 20, which is a controller for controlling the actual operations of the robot 30 and the positioner 40, in such a manner that the data transmission can be carried out between the teaching data storage unit 14 and the robot control device 20. The robot control device controls various operations of the robot 30 and the positioner 40 based on the teaching programs registered in the teaching data storage unit 14.

In FIG. 1, the teaching data storage unit 14 (the teaching system 10) and the robot control device 20 are connected to each other. However, if the teaching programs generated in the teaching system 10 can be stored in a storage unit (not shown) of the robot control device 20, the teaching data storage unit 14 (the teaching system 10) and the robot control device 20 need not be necessarily connected to each other.

For example, the teaching programs generated in the teaching system 10 may be copied onto a storage medium such as a USB (Universal Serial Bus) or the like. Then, after connecting the storage medium to the robot control device 20, the teaching programs included in the storage medium may be stored in the storage unit of the robot control device 20 through a specified operation.

In FIG. 1, for the sake of making the description readily understandable, there is illustrated an example in which the teaching data storage unit 14 and the teaching control device 11 are provided separately. Alternatively, the information of the teaching data storage unit 14 may be stored in the storage unit of the teaching control device 11.

The robot 30 includes a base unit 31, a first arm 32, a second arm 33, a wrist unit 34 and an end effector 35. The base unit 31 is fixed to a floor surface or the like. The base unit 31 supports the base end portion of the first arm 32 so that the first arm 32 can rotate about an axis S (see an arrow 101 in FIG. 1) and can rotate about an axis L (see an arrow 102 in FIG. 1).

The base end portion of the first arm 32 is supported on the base unit 31 as mentioned above. The tip end portion of the first arm 32 supports the base end portion of the second arm 33 so that the second arm 33 can rotate about an axis U (see an arrow 103 in FIG. 1).

The base end portion of the second arm 33 is supported on the first arm 32 as mentioned above. The tip end portion of the second arm 33 supports the base end portion of the wrist unit 34 so that the wrist unit 34 can rotate about an axis B (see an arrow 105 in FIG. 1). The second arm 33 is installed so as to rotate about an axis R (see an arrow 104 in FIG. 1).

The base end portion of the wrist unit 34 is supported on the second arm 33 as mentioned above. The tip end portion of the wrist unit 34 supports the base end portion of the end effector 35 so that the end effector 35 can rotate about an axis T (see an arrow 106 in FIG. 1).

The end effector 35 employed in the present embodiment is a welding torch. The base end portion of the end effector 35 is supported on the wrist unit 34 as mentioned above.

The positioner 40 includes a base unit 41 and a mounting stand 42. The base unit 41 is fixed to a floor surface or the like. The base unit 41 supports the mounting stand 42 so that the mounting stand 42 can make tilting movement about an axis EX1 (see an arrow 107 in FIG. 1).

The mounting stand 42 is a stand for mounting a workpiece W, which is a welding target, thereon and is installed so as to rotate about an axis EX2 (see an arrow 108 in FIG. 1). The mounting stand 42 rotates the workpiece W mounted thereon. The axes EX1 and EX2 of the positioner are regarded as external axes of the robot 30 and are controlled by the robot control device 20.

Drive sources such as servo motors or the like are mounted to the respective joints of the robot 30 and the rotation mechanisms of the positioner 40. Responsive to an operation instruction transmitted from the robot control device 20, the drive sources drive the respective joints of the robot 30 and the rotation mechanisms of the positioner 40.

Figure 2:
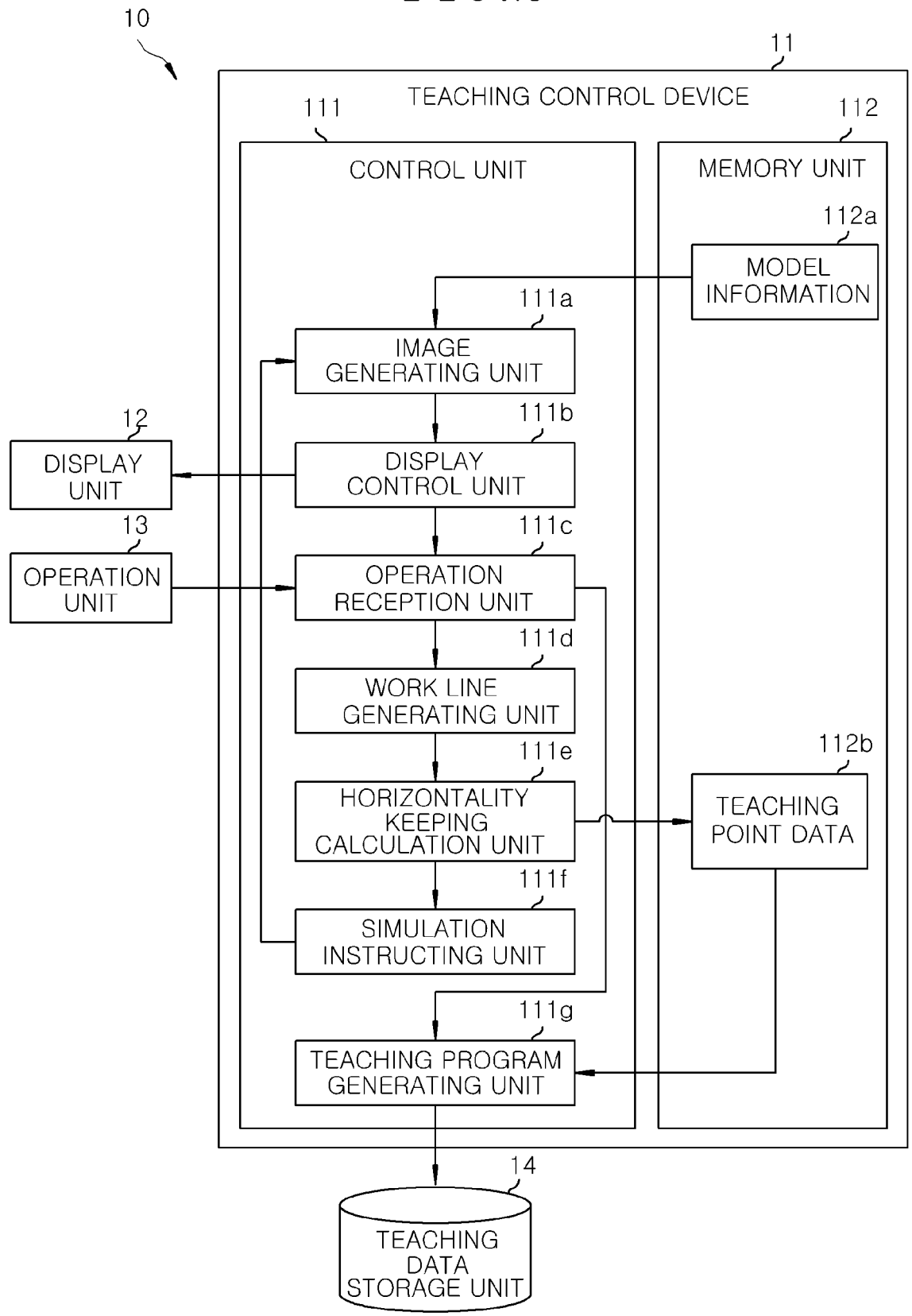
FIG. 2 is a block diagram illustrating a configuration of a teaching system according to an embodiment.

Next, the block configuration of the teaching system according to an embodiment will be described with reference to FIG. 2. In FIG. 2, there are shown only the components required in describing the teaching system 10. Typical components are not shown in FIG. 2.

The internal configuration of the teaching control device 11 will be primarily described with reference to FIG. 2. The display unit 12, the operation unit 13 and the teaching data storage unit 14 shown in FIG. 1 will be briefly described in some cases.

As shown in FIG. 2, the teaching control device 11 includes a control unit 111 and a memory unit 112. The control unit 111 includes an image generating unit 111a, a display control unit 111b, an operation reception unit 111c, a work line generating unit 111d, a horizontality keeping calculation unit 111e, a simulation instructing unit 111f and a teaching program generating unit 111g. The memory unit 112 stores model information 112a and teaching point data 112b.

Based on the model information 112a, the image generating unit 111a generates a virtual image of the robot system 1 including the robot 30 and the positioner 40 for holding the workpiece W. The model information 112a includes graphic information defined in advance with respect to the types of the robot 30, the positioner 40 and the workpiece W.

The image generating unit 111a outputs the generated virtual image of the robot system 1 to the display control unit 111b. The display control unit 111b controls the display unit 12 to display the virtual image of the robot system 1 received from the image generating unit 111a.

The operation reception unit 111c receives an operator's input operation through the operation unit 13. If the input operation pertains to a simulation instruction, the operation reception unit 111c notifies the work line generating unit 111d of the received input operation. Here, the input operation pertaining to the simulation instruction is a selection operation for selecting a ridgeline of the workpiece W displayed on the display unit 12.

Figure 3:
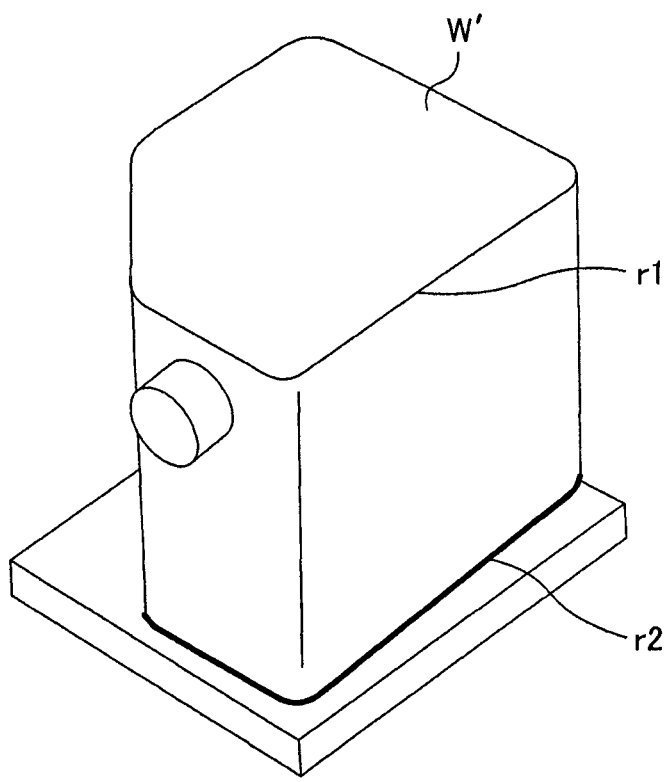
FIG. 3 is a view explaining an operation of selecting a ridgeline of a workpiece.

Now, description will be made on the ridgeline of the workpiece W. FIG. 3 is a view explaining an operation of selecting a ridgeline of the workpiece W. It is assumed that a workpiece W' shown in FIG. 3 is the virtual image of the workpiece W displayed on the display unit 12.

In general, the term "ridgeline" refers to a portion equivalent to an edge designated by r1 in FIG. 3. In the present embodiment, for the sake of convenience, a seam portion between surfaces will also be referred to as a "ridgeline".

Thus, the "ridgeline" referred to in the present embodiment may be, e.g., a seam portion corresponding to a valley existing between edges as designated by r2 in FIG. 3. While not shown in the drawings, the ridgeline may be a seam portion between overlapping surfaces.

The ridgeline r1 and the ridgeline r2 are displayed in such a fashion that they can be selected by the operation unit 13 when a virtual image (i.e., the workpiece W') of the workpiece W is displayed on the display unit 12. For example, when a mouse cursor is moved toward the workpiece W', the color of the entire ridgelines may be changed to a blue color or the entire ridgelines may flicker.

It is assumed that an operator clicks a point on one of the ridgelines r1 and r2, e.g., the ridgeline r2. In this case, it is preferred that the selection of the ridgeline r2 is clearly identified by, e.g., indicating the ridgeline r2 thicker than the other ridgelines as shown in FIG. 3. Instead of changing the thickness of the ridgeline, the selection of the ridgeline may be identified in color by, e.g., changing the color of the selected ridgeline from a blue color to a yellow color.

A process for extracting a ridgeline of the workpiece W from the virtual image is performed by the control unit 111 with reference to the model information 112a. This process is well-known in the art and, therefore, will not be described herein.

The workpiece W' shown in FIG. 3 is nothing more than one example and is not intended to limit the shape or the number of ridgelines. In the present embodiment, description will be made under the assumption that an operator selects the ridgeline r2 of the workpiece W' shown in FIG. 3.

Referring back to FIG. 2, description will be made on the operation reception unit 111c. If the input operation is intended to instruct generation of teaching programs, the operation reception unit 111c notifies the teaching program generating unit 111g of the received input operation. Here, the input operation instructing generation of teaching programs may be, e.g., an operation of clicking an operation component such a "teaching program generation button" displayed on the display unit 12.

When the operation reception unit 111c notifies of the work line generating unit 111d of the operation of selecting the ridgeline r2 of the workpiece W', the work line generating unit 111d extracts individual teaching target points of the ridgeline r2 and generates a work line which is a group of the target points, namely a set of line segments interconnecting the adjoining target points at a shortest distance. In the present embodiment, the work line corresponds to a welding line.

Based on the welding line generated by the work line generating unit 111d, the horizontality keeping calculation unit 111e calculates teaching values for the positions of the respective axes of the rotation mechanisms of the positioner 40 on a point-by-point basis so that the vector direction of the welding line at each of the target points becomes substantially parallel to the horizontal direction.

The horizontality keeping calculation unit 111e registers the calculated teaching values of the positioner 40 corresponding to the target points in the teaching point data 112b.

More specifically, the position of the positioner 40 is defined by the coordinates of each of the target points in a three-dimensional coordinate system and the posture of the positioner 40 is defined by the vector direction of the welding line at each of the target points, for example. In this case, the horizontality keeping calculation unit 111e calculates the teaching values for the axes EX1 and EX2 of the positioner 40 by inverse kinematics calculation at each of the target points so that the posture of the positioner becomes substantially parallel to the horizontal direction and so that the position of the positioner 40 becomes suitable for a welding work performed by a robot.

In case where the positioner 40 takes the respective teaching values, the horizontality keeping calculation unit 111e calculates teaching values for the respective joint axes of the robot 30 by inverse kinematics calculation so that the tip end of a welding torch can reach the respective target points. The horizontality keeping calculation unit 111e registers the calculated teaching values in the teaching point data 112b.

Upon receiving an input operation that instructs a simulation operation, the horizontality keeping calculation unit 111e notifies the simulation instructing unit 111f of the respective teaching values of the positioner 40 and the robot 30.

The simulation instructing unit 111f notifies the image generating unit 111a of a simulation instruction for causing the image generating unit 111a to regenerate a virtual image of the positioner 40 whose posture is changed in conformity with the teaching values of the positioner 40 corresponding to the respective target points notified from the horizontality keeping calculation unit 111e and a virtual image of the robot 30 whose position and posture are changed in conformity with the positioner 40.

Based on the simulation instruction received from the simulation instructing unit 111f, the image generating unit 111a regenerates a virtual image including the positioner 40 and the robot 30 and displays the virtual image on the display unit 12 through the display control unit 111b. In response, there is displayed a simulation operation in which the virtual image including the positioner 40 and the robot 30 is consecutively changed.

When an operator performs an operation of selecting a ridgeline, the position of each axis of the positioner 40 where the line segment including the point on the ridgeline r2 clicked by the operator becomes parallel to the horizontal direction is assumed to be an initial position. A virtual image of the positioner 40 which has reached the initial position may be generated and displayed on the display unit 12.

Next, a series of processes from the operation reception unit 111c to the horizontality keeping calculation unit 111e will be described in detail with reference to FIGS. 4A to 5D.

First, one example of the virtual image 300 generated by the image generating unit 111a and displayed on the display unit 12 through the display control unit 111b will be described with reference to FIG. 4A.

Figure 4A:
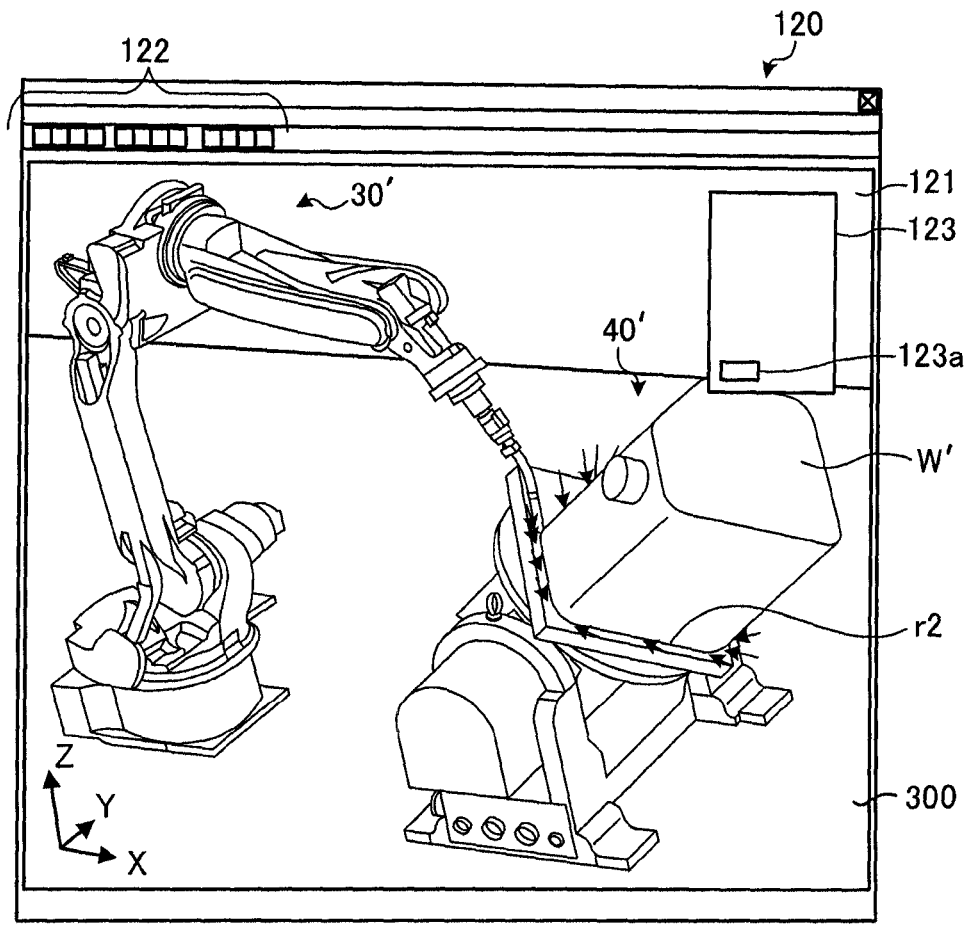
FIG. 4A is a schematic diagram illustrating one example of a virtual image displayed on a display unit.

FIG. 4A is a schematic diagram showing one example of the virtual image 300 displayed on the display unit 12. As shown in FIG. 4A, the virtual image of the robot system 1 including the robot 30 and the positioner 40 is displayed on a display window 120 that is one of the display regions of the display unit 12. In the illustrated example, a robot 30', a workpiece W' and a positioner 40', which are virtual images of the actual robot 30, the actual workpiece W and the actual positioner 40, are displayed on the display window 120.

More specifically, the virtual image 300 is displayed in a virtual image region 121 on the display window 120. The display window 120 is provided with a GUI (Graphical User Interface) widget that includes buttons 122 and a dialogue box 123.

A rectangular coordinate system is displayed at a left lower side on the virtual image region 121. The rectangular coordinate system serves as a reference coordinate system within the virtual image 300. The rectangular coordinate system corresponds to the three-dimensional coordinate system described earlier and becomes a reference by which a horizontal direction and a vertical direction are defined. Specifically, the direction parallel to an XY plane defined by an X-axis and a Y-axis of the reference coordinate system becomes a horizontal direction. The direction parallel to a Z-axis of the reference coordinate system becomes a vertical direction.

The operator performs an instruction operation with respect to the teaching system 10 by operating an operable part (e.g., the ridgeline r2 of the workpiece W') on the GUI widget or the virtual image.

Responsive to the operator's instruction operation, the teaching system 10 can drive the respective joints of the robot 30' or the rotation mechanisms of the positioner 40' of the virtual image on the display unit 12. Moreover, the teaching system 10 can change the viewpoint that decides the viewing direction of the displayed virtual image and can enlarge or reduce the displayed virtual image.

Furthermore, the teaching system 10 can find, by inverse kinematics calculation, the positions of the respective joints of the robot 30 where the virtual image of the end effector 35 (the tip end of the welding torch in the present embodiment) reaches a particular point on the virtual image 300, and can generate and display the virtual image of the robot 30 that has reached the particular point.

In response to the operator's instruction operation, the teaching system 10 can read the teaching points or the teaching programs registered in the teaching data storage unit 14 and can display the virtual images of the robot 30 and the positioner 40 that have reached particular teaching points. Furthermore, the teaching system 10 can reproduce, on the display unit 12, a series of operations of the robot 30 and the positioner 40 performed according to the teaching programs.

These functions in an off-line teaching system of a robot are well-known in the art. Therefore, the description of the functions not related with the present embodiment will be omitted herein.

The "teaching program generation button" mentioned above may be arranged in, e.g., a button 123a of the dialogue box 123.

In the present embodiment, it is assumed that an operator selects the ridgeline r2 of the workpiece W'. In this case, the work line generating unit 111d performs a process to extract individual teaching target points of the ridgeline r2, thereby generating a welding line as a group of target points.

Figure 4B:
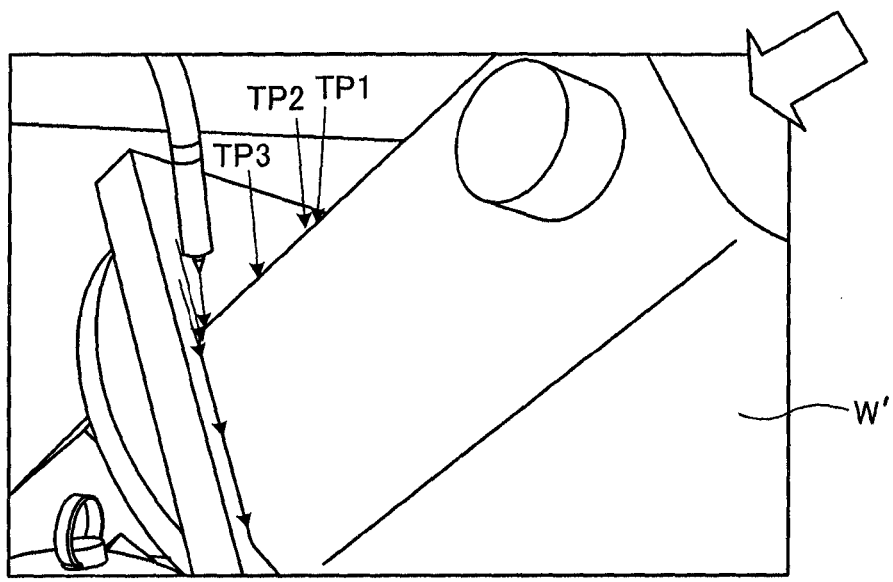
FIG. 4B is a schematic diagram illustrating one example of a virtual image in which individual target points are extracted and indicated.

FIG. 4B is a schematic diagram illustrating one example of a virtual image in which the respective target points are extracted and displayed. As shown in FIG. 4B, the respective target points are designated by arrows directed toward the ridgeline r2.

The extraction of the target points are automatically carried out. In general, the interval of the target points is not uniform. The target points are extracted at a shorter interval in the portions (the round corner portions of the ridgeline) where the vector direction of the welding line is changed.

The interval of the target points may be decided depending on not only the change in the vector direction of the welding line but also the pre-inputted welding conditions (such as a welding speed, a welding voltage, a welding current, a material of a welding wire, a diameter of a welding wire and a feeding speed of a welding wire).

For the sake of making the description easily understandable, three of the arrows are designated by reference symbols TP1, TP2 and TP3. Description will be made with reference to FIGS. 5A to 5D by taking only the reference symbols TP1, TP2 and TP3 as examples of the target points. FIGS. 5A to 5D are views seen in an arrow direction A depicted in FIG. 4B.

Figure 5A:
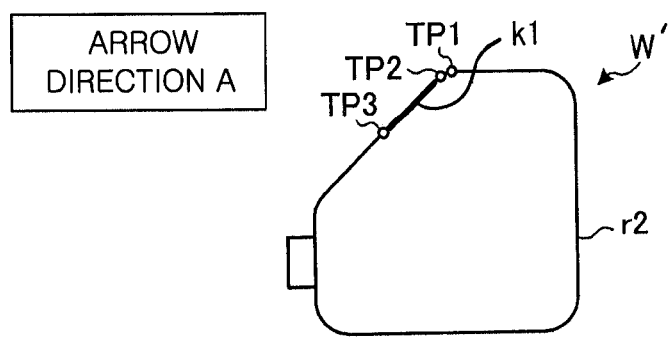
FIG. 5A is a schematic diagram showing a workpiece seen in an arrow direction A.
Figure 5B:
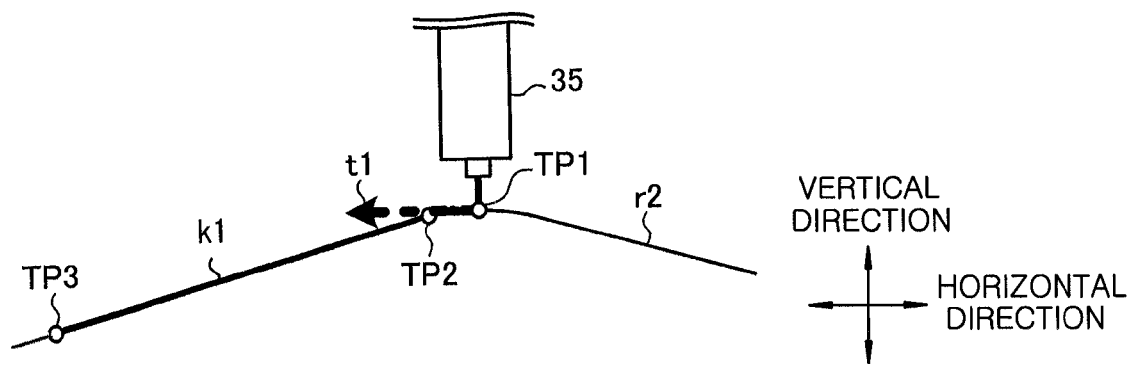
FIG. 5B is a first view explaining a horizontality keeping calculation unit.
Figure 5C:
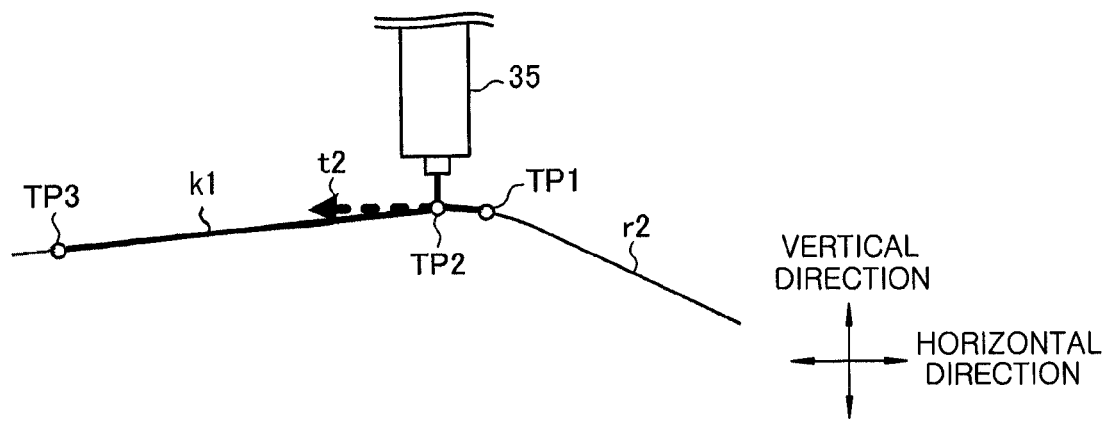
FIG. 5C is a second view explaining the horizontality keeping calculation unit.
Figure 5D:
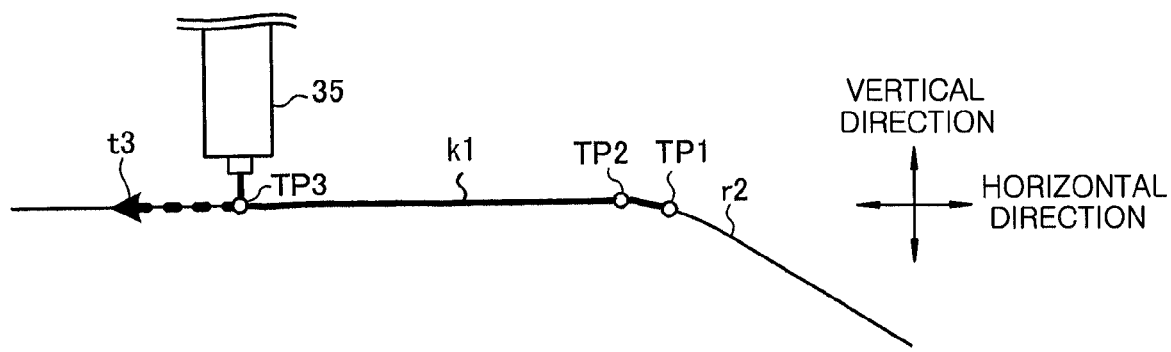
FIG. 5D is a third view explaining the horizontality keeping calculation unit.

FIG. 5A is a schematic diagram of the workpiece W' seen in the arrow direction A. FIGS. 5B to 5D are first to third views explaining the horizontality keeping calculation unit 111e.

It is assumed that, as shown in FIG. 5A, the target points TP1, TP2 and TP3 are extracted along a part of the ridgeline r2 of the workpiece W'. It is also assumed that welding is performed in the order of the target points TP1, TP2 and TP3. In the example shown in FIGS. 5A to 5D, a line k1 extending from the target point TP1 to the target point TP3 corresponds to the welding line (the work line).

In this case, as shown in FIG. 5B, the horizontality keeping calculation unit 111e initially performs inverse kinematics calculation to find the positions of the axes EX1 and EX2 of the positioner 40 so that the tangential direction t1 of the ridgeline r2 at the target point TP1 becomes substantially parallel to the horizontal direction.

Furthermore, the horizontality keeping calculation unit 111e performs inverse kinematics calculation to find the positions of the respective joint axes of the robot 30 so that the tip end of the welding torch can reach the target point TP1 shown in FIG. 5B. The posture of the welding torch may be set to have a predetermined advance angle or a predetermined inclination angle.

Subsequently, as shown in FIG. 5C, the positions of the axes EX1 and EX2 of the positioner 40 are obtained by the horizontality keeping calculation unit 111e so that the tangential direction t2 of the ridgeline r2 at the target point TP2 becomes substantially parallel to the horizontal direction.

The positions of the respective joint axes of the robot 30 are obtained by the horizontality keeping calculation unit 111e so that the tip end of the welding torch can reach the target point TP2 shown in FIG. 5C.

Similarly, as shown in FIG. 5D, the positions of the axes EX1 and EX2 of the positioner 40 are obtained by the horizontality keeping calculation unit 111e so that the tangential direction t3 of the ridgeline r2 at the target point TP3 becomes substantially parallel to the horizontal direction. In the example shown in FIG. 5D, during the movement of the tip end of the welding torch from the target point TP2 to the target point TP3, the tangential direction t3 is kept substantially parallel to the horizontal direction even if the shafts of the positioner 40 are not particularly operated.

The horizontality keeping calculation unit 111e finds the positions of the respective joint axes of the robot 30 so that the tip end of the welding torch can reach the target point TP3 shown in FIG. 5D.

That is to say, the horizontality keeping calculation unit 111e performs calculation of the positions of the rotation mechanisms of the positioner 40 so that the tangential directions of the ridgeline r2, namely the vector directions of the welding line, at the entire target points TP1, TP2 and TP3 become substantially parallel to the horizontal direction at all times. Moreover, the horizontality keeping calculation unit 111e performs calculation of the positions of the respective joint axes of the robot 30 corresponding to the positions of the rotation mechanisms of the positioner 40.

In accordance with the present embodiment, even in a case of teaching a welding work with respect to a welding line having a complex shape, it is possible to generate appropriate teaching programs for automatically driving the respective shafts of the rotation mechanism of the positioner 40 so that the currently welded portion becomes substantially parallel to the horizontal direction. It is also possible to reduce a teaching burden borne by the operator and to improve a welding quality.

It is often the case that a plurality of solutions is found by the inverse kinematics calculation of the horizontality keeping calculation unit 111e. An operation procedure used in this case will be described with reference to FIGS. 6A to 6C. FIG. 6A is a view showing an operation procedure according to a first modified example. FIGS. 6B and 6C are first and second views showing display examples according to the first modified example.

In this case, as shown in FIG. 6A, for example, the dialogue box 123 may be displayed on the display window 120 and a plurality of solutions may be directly displayed on the dialogue box 123 in the form of a list. Then, the operator may select one of the solutions thus listed up.

FIG. 6A shows an example of a case in which two solutions are found. In this case, if the operator clicks one of the listed-up solutions, a virtual image of the positioner 40 corresponding to the clicked solution may be instantly displayed.

For example, if the operator clicks the numeral "1" in FIG. 6A, a virtual image of the positioner 40 is displayed as shown in FIG. 6B. If the operator clicks the numeral "2" in FIG. 6A, a virtual image of the positioner 40 is displayed as shown in FIG. 6C.

Therefore, even if a plurality of solutions is found in the horizontality keeping calculation unit 111e, the operator can instantly select an appropriate one of the solutions by observing the displayed virtual images.

In the description made above, the horizontality keeping calculation unit 111e is configured to find a solution so that the vector direction of the welding line at each of the target points TP1, TP2 and TP3 becomes substantially parallel to the horizontal direction. Alternatively, the vector direction of the welding line may be adjusted.

Figure 6D:
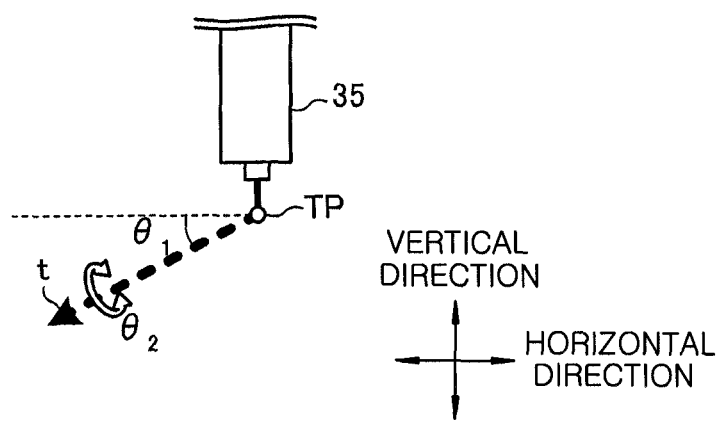
FIG. 6D is a view explaining a second modified example.
Figure 6E:
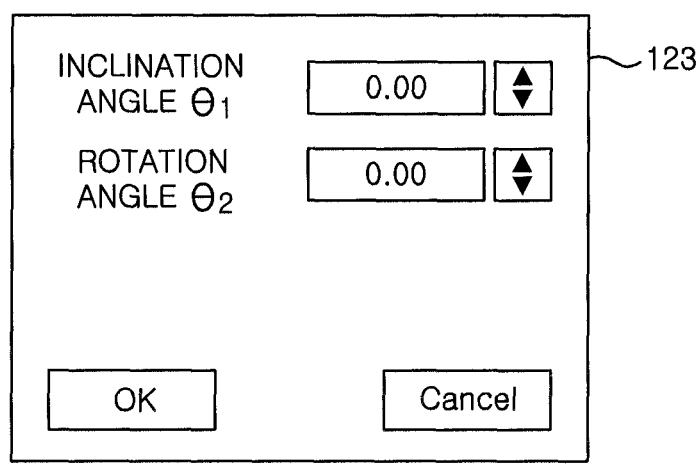
FIG. 6E is a view showing an operation procedure according to the second modified example.

FIG. 6D is a view explaining a second modified example. FIG. 6E is a view showing an operation procedure according to the second modified example. In FIG. 6D, for the sake of convenience, the inclination angle θ1 of the vector direction t of the welding line is indicated on an exaggerated scale.

As shown in FIG. 6D, the vector direction t of the welding line extending from the target point TP may be adjusted to become an arbitrary direction with respect to the horizontal direction. For example, FIG. 6D shows an example in which the vector direction t of the welding line is slightly inclined downward by an inclination angle θ1.

If the vector direction t of the welding line is slightly inclined downward in this manner, a bead extends forward in the welding direction under the action of the gravity. This makes it possible to obtain an advantage in that the bead is hardly left untidy. If necessary, the vector direction t of the welding line may be slightly inclined upward.

As shown in FIG. 6D, the workpiece W' and the positioner 40' may be rotated about the vector direction t of the welding line by a rotation angle θ2. By adjusting the rotation angle θ2, it is possible to appropriately set the posture of a ridgeline (seam) with respect to the gravity direction. This makes it possible to obtain an advantage of improving a welding quality.

In case of the second modified example, it is preferred that, as shown in FIG. 6E, input boxes of designated values of the inclination angle θ1 and the rotation angle θ2 are arranged in, e.g., the dialogue box 123 so that the operator can designate the inclination angle θ1 and the rotation angle θ2. In this case, the horizontality keeping calculation unit 111e calculates teaching values for the positions and postures of the positioner 40 on a point-by-point basis so that the vector direction of the welding line at each of the target points becomes substantially parallel to the horizontal direction. Thereafter, if a designated value is inputted by the operator, the horizontality keeping calculation unit 111e can calculate additional teaching values so that the vector direction of the welding line can be inclined by the designated value with respect to the horizontal direction.

Alternatively, if a designated value is inputted by the operator, the horizontality keeping calculation unit 111e may calculate, from the beginning, teaching values for the positions and postures of the positioner 40 on a point-by-point basis so that the vector direction of the welding line at each of the target points can be inclined by the designated value with respect to the horizontal direction.

Referring back to FIG. 2, description will be made on the teaching program generating unit 111g of the teaching control device 11. Upon receiving an input operation instructing generation of teaching programs from the operation reception unit 111c, the teaching program generating unit 111g generates teaching programs for the operation of the actual robot 30 and the actual positioner 40 based on the teaching point data 112b and registers the teaching programs in the teaching data storage unit 14.

The memory unit 112 is a memory device such as a hard disk drive, a nonvolatile memory or the like. The memory unit 112 stores the model information 112a and the teaching point data 112b. The contents of the model information 112a and the teaching point data 112b have been described above and, therefore, will not be further described here.

In the description made above with reference to FIG. 2, there is illustrated an example in which the teaching control device 11 generates the virtual image of the robot 30 and the positioner 40 based on the model information 112a registered in advance. Alternatively, it may be possible to sequentially acquire the information required for image generation from a host device connected to the teaching control device 11 in a mutually communicating manner.

As described above, the teaching system according to the present embodiment includes the display unit, the image generating unit, the display control unit, the work line generating unit, the horizontality keeping calculation unit (the calculation unit) and the teaching program generating unit.

The image generating unit generates the virtual image of the robot system including the robot and the positioner for holding a workpiece, which is a work target of the robot. The display control unit controls the display unit to display the virtual image generated by the image generating unit.

Upon receiving an operator's operation of selecting a ridgeline of the workpiece of the virtual image, the work line generating unit extracts individual teaching target points existing on the ridgeline and generates a welding line (work line) as a group of the target points.

The horizontality keeping calculation unit calculates teaching values for the positions and postures of the positioner on a point-by-point basis so that the vector direction of the welding line at each of the target points becomes substantially parallel to the horizontal direction. The teaching program generating unit generates teaching programs for the operation of the actual robot and the actual positioner based on the teaching values calculated by the horizontality keeping calculation unit.

In accordance with the teaching system of the present embodiment, it is possible to easily keep a welding line horizontal, thereby reducing a burden borne by the operator and improving a work quality.

In the aforementioned embodiment, there has been illustrated an example in which the robot is a six-axis single-arm robot. However, this is not intended to limit the number of axes or the number of arms. In the aforementioned embodiment, there has been illustrated an example in which the positioner includes two axes. However, the positioner may have three or more axes.

In the aforementioned embodiment, there has been illustrated a case where a mouse is primarily used as the operation unit and where a workpiece ridgeline selection operation or an input operation is performed by the mouse. However, the present disclosure is not limited thereto. For example, the display unit may be formed of a so-called multi-touch-type touch panel, and the workpiece ridgeline selection operation or the like may be performed by the operator's multi-touch operation with respect to the touching panel Other effects and other modified examples can be readily derived by those skilled in the art. For that reason, the broad aspect of the present disclosure is not limited to the specific disclosure and the representative embodiment shown and described above. Accordingly, the present disclosure can be modified in many different forms without departing from the spirit and scope defined by the appended claims and the equivalents thereof.

What is claimed is:

1. A teaching system comprising:
a display unit;
an image generating unit configured to generate a virtual image of a robot, a workpiece as a work target of the robot and a positioner for holding the workpiece, the positioner having a plurality of axes;
a display control unit configured to control the display unit to display the virtual image generated by the image generating unit;
a work line generating unit configured to, upon receiving an operator's operation of selecting a ridgeline of the workpiece of the virtual image, extract individual teaching target points of the ridgeline and generate a work line as a set of line segments each interconnecting the target points adjoining each other;
a calculation unit configured to calculate teaching values for the axes of the positioner on a point-by-point basis so that a vector direction of the work line at each of the target points becomes substantially parallel to a horizontal direction; and
a teaching program generating unit configured to generate a teaching program for operating the positioner based on the teaching values calculated by the calculation unit,
wherein when plural solutions are found by the calculation unit for the teaching values, the image generating unit renders the plural solutions to be included in the virtual image to allow an operator to select an appropriate solution among the plural solutions, and
wherein when the operator selects one of the plural solutions, the image generating unit generates a new virtual image in which a position and a posture of the positioner has been changed based on teaching values corresponding to said one of the plural solutions.

2. The teaching system of claim 1, wherein the calculation unit is configured to adjust the vector direction of the work line based on a value designated by the operator so that the vector direction of the work line becomes an arbitrary direction with respect to the horizontal direction.

3. The teaching system of claim 2, wherein the vector direction of the work line is adjusted to be inclined downward with respect to the horizontal direction.

4. The teaching system of claim 3, further comprising:
a simulation instructing unit configured to cause the image generating unit to regenerate the virtual image including the positioner whose posture is changed in conformity with the teaching values calculated by the calculation unit.

5. The teaching system of claim 2, further comprising:
a simulation instructing unit configured to cause the image generating unit to regenerate the virtual image including the positioner whose posture is changed in conformity with the teaching values calculated by the calculation unit.

6. The teaching system of claim 1, further comprising:
a simulation instructing unit configured to cause the image generating unit to regenerate the virtual image including the positioner whose posture is changed in conformity with the teaching values calculated by the calculation unit.

7. The teaching system of claim 1, further comprising:
a teaching data storage unit serving as a database configured to register the teaching program for operating the positioner and teaching data included into the teaching program.

8. A robot system comprising the teaching system of claim 1.

9. The robot system of claim 8, further comprising the robot, the positioner for holding the workpiece and a robot control device configured to control operations of the robot and the positioner.

10. The teaching system of claim 1, wherein the calculation unit calculates the teaching values by performing an inverse kinematics calculation.

11. A teaching method comprising:
  generating a virtual image of a robot system including a robot and a positioner for holding a workpiece as a work target of the robot, the positioner having a plurality of axes;
  controlling a display unit to display the generated virtual image in the image generating step;
  extracting individual teaching target points of a ridgeline of the workpiece of the virtual image which is selected by an operator's operation and generating a work line as a set of line segments each interconnecting the target points adjoining each other;
  calculating teaching values for the axes of the positioner on a point-by-point basis so that a vector direction of the work line at each of the target points becomes substantially parallel to a horizontal direction;
  generating a teaching program based on the calculated teaching values; and
  operating the positioner holding the workpiece using the teaching program,
  wherein when plural solutions are found for the teaching values, the plural solutions are included in the displayed virtual image to allow an operator to select an appropriate solution among the plural solutions, and
  wherein when the operator selects one of the plural solutions, a new virtual image in which a position and a posture of the positioner has been changed based on teaching values corresponding to said one of the plural solutions is generated and displayed on the display unit.

12. The teaching method of claim 11, wherein, in said calculating, the teaching values are calculated by an inverse kinematics calculation.

13. The teaching method of claim 11, wherein said operating includes driving a rotation mechanism of the positioner using the teaching program.

14. The teaching method of claim 11, wherein said operating includes driving a rotation mechanism of the positioner using the teaching program such that a current work portion on the workpiece is substantially parallel to the horizontal direction.

* * * * *